United States Patent Office 3,105,584
Patented Oct. 1, 1963

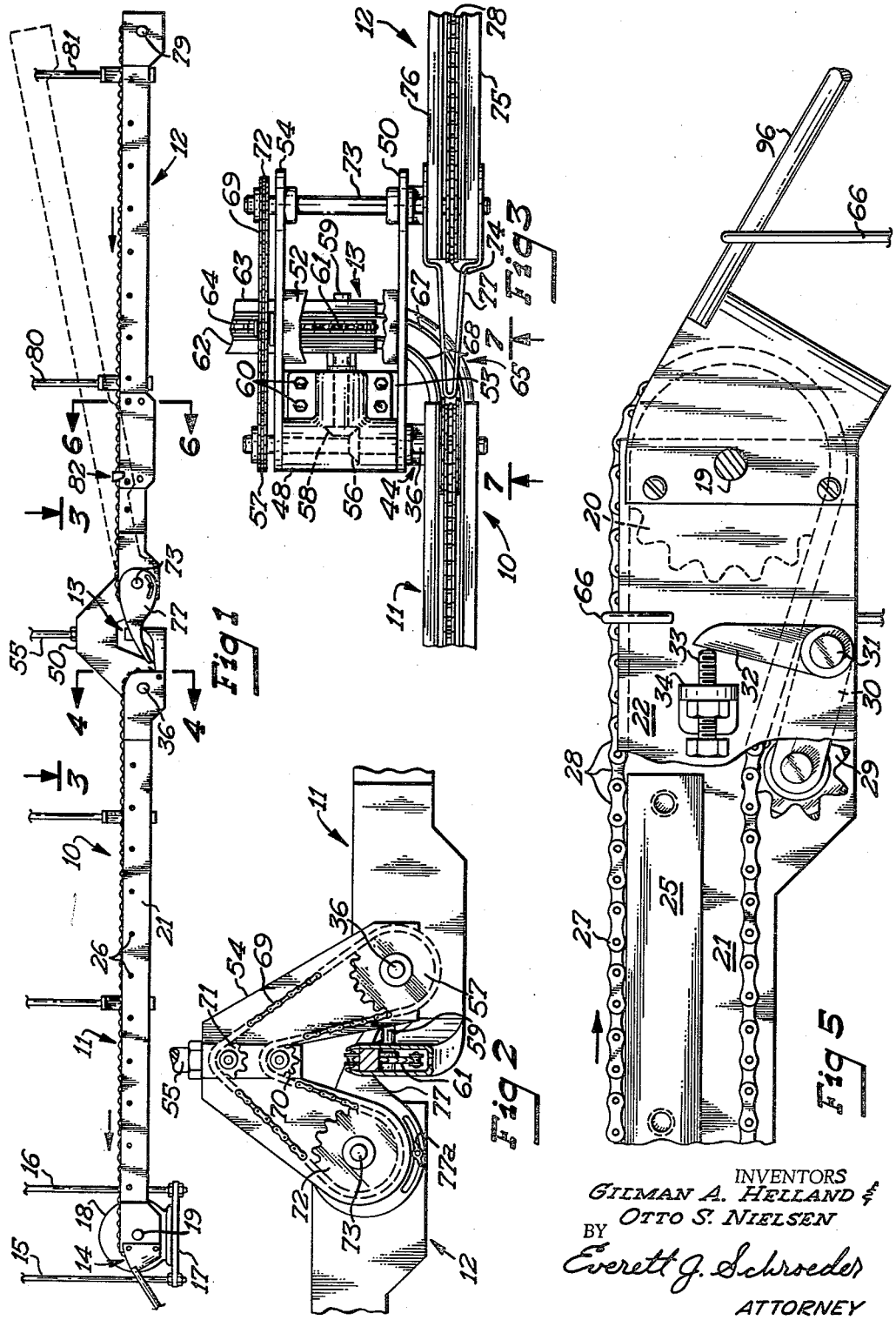

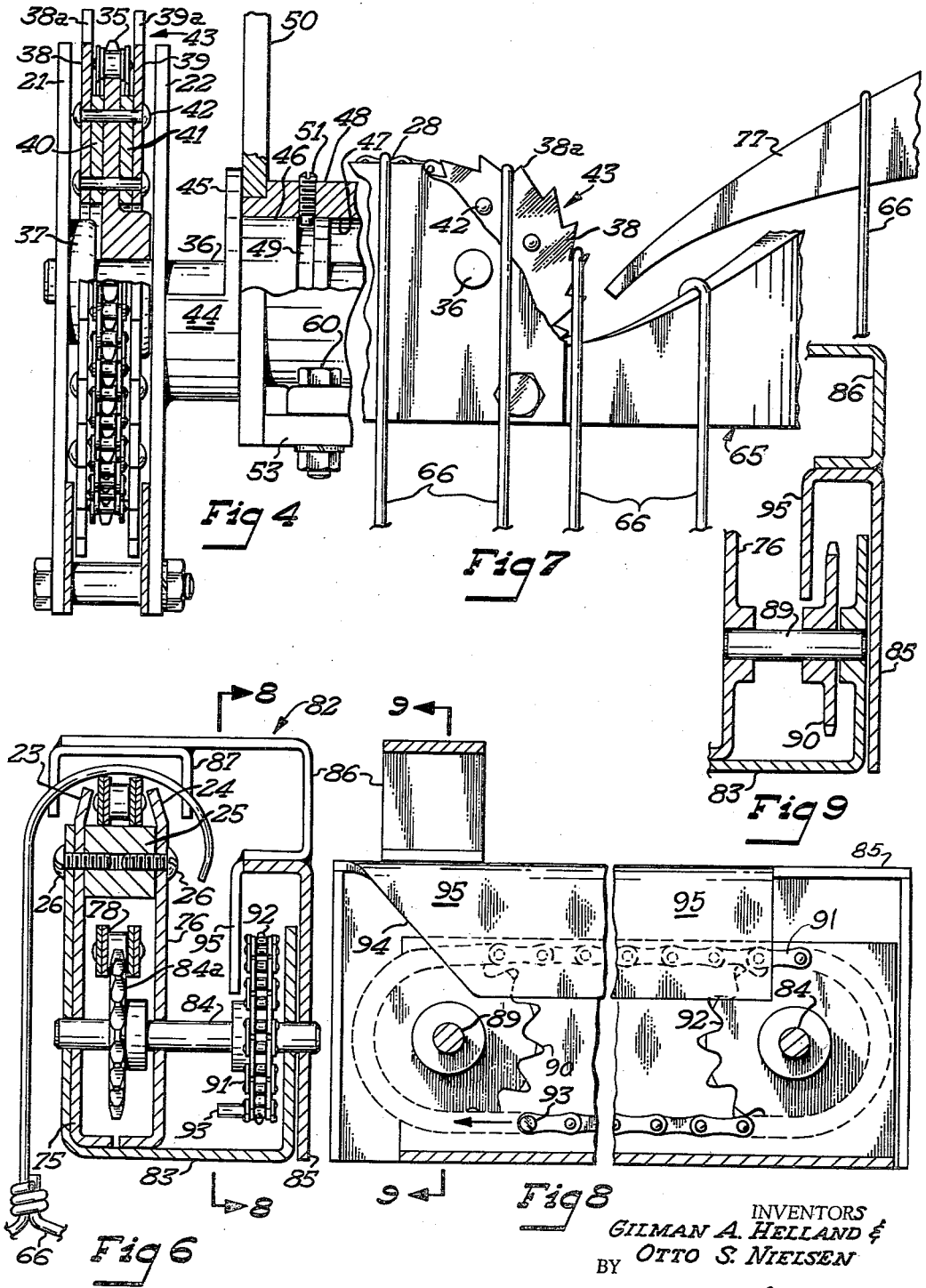

3,105,584
OVERHEAD MATERIAL HANDLING CONVEYOR
Gilman A. Helland, Navarre, and Otto S. Nielsen, Minneapolis, Minn.; said Helland assignor to said Nielsen
Continuation of application Ser. No. 856,059, Nov. 30, 1959. This application May 15, 1961, Ser. No. 109,938
17 Claims. (Cl. 198—26)

This invention relates broadly to material handling conveyors. More particularly, it relates to overhead conveyor systems designed to convey articles overhead within building constructions, especially wherein the conveyor system is to include one or more powered lateral feed lines having a junction with a primary powered conveyor line.

This application is a continuation application of our previously filed application entitled "Overhead Material Handling Conveyor," Serial No. 856,059, filed by us on November 30, 1959, now abandoned in favor of the present application.

Overhead conveying systems previously known for conveying suspended articles have all had the major objection of being costly, cumbersome, and complex. Our invention is designed toward overcoming these disadvantages.

It is a general object of our invention to provide a novel and improved overhead conveyor system of simple and inexpensive construction and operation.

A more specific object is to provide a novel and improved conveyor system which may operate continuously and very inexpensively with a minimum or complete lack of attention thereto, the entire system being unusually simple and inexpensive in construction.

Another object is to provide a single powered overhead conveyor line of simple, inexpensive, and improved construction and operable with or without one or more feeder lines.

Another object is to provide a conveyor system of the overhead type of simple and inexpensive construction which utilizes one or more lateral feeder lines making a junction with a primary powered conveyor line at any desired point in the latter.

Another object is to provide a novel and improved overhead conveying system utilizing a primary power conveyor line and one or more lateral feeder lines feeding thereinto wherein the lateral feed lines are operated under full automatic control so as to relate the time and extent of feed of each of the lines to that of the other and to the primary line as desired.

Another object is to provide an overhead conveying system of simple and inexpensive construction which includes automatic control means in the form of a timer actuated periodically to regulate the release and transfer of material hangers from one section of the conveying system to a second section thereof.

Another object is to provide a novel and improved overhead conveying system of simple and inexpensive construction and operation which includes one or more lateral feeder lines which are constructed and arranged to enable the same to extend at an angle to the other sections of the conveying system in either a horizontal or vertical plane or both.

Another object is to provide a novel and improved overhead conveying system wherein the primary conveyor line and the secondary feeder lines are vertically pivotable relative to each other, the individual lines being capable of being constructed and operated in any linear length.

Another object is to provide a sectional overhead conveyor system wherein one or more sources of power may be installed in the primary conveyor line and/or its secondary feeder line which may or may not extend laterally from the primary powered line.

A further object of our invention is to provide a conveyor system of the overhead type utilizing the free material hanger or support system wherein the material supporting members may be loaded onto the individual conveyor lines at any point therealong.

Another object is to provide a novel and improved overhead conveyor system of simple and inexpensive construction having unique means for transferring power from one section of the system to another whereby a single source of rotary power may be utilized to power the entire overhead system.

Another object of our invention is to provide a novel and improved overhead conveyor system of simple and inexpensive construction constructed and arranged to utilize lateral feeder lines at the same or different elevations which may extend at any desired angle to the primary powered conveyor line up to and including ninety degrees.

These and other objects and advantages of our invention will more fully appear from the following description, made in connection with the accompanying drawings, wherein like reference characters refer to the same or similar parts throughout the several views, and in which:

FIG. 1 is a side elevational view of one embodiment of our invention with an alternate position of one of the sections thereof shown in broken lines.

FIG. 2 is a fragmentary side elevational view on an enlarged scale of the power transfer mechanism as viewed from the opposite side of that shown in FIG. 1.

FIG. 3 is a fragmentary plan view on an enlarged scale taken along line 3—3 of FIG. 1.

FIG. 4 is a vertical sectional view on an enlarged scale taken along line 4—4 of FIG. 1.

FIG. 5 is a side elevational view on an enlarged scale of the discharge portion of the conveyor system shown at the left hand side of FIG. 1 and viewed from the opposite side, with portions thereof broken away to illustrate the interior of the conveyor section.

FIG. 6 is a vertical sectional view on an enlarged scale taken along line 6—6 of FIG. 1.

FIG. 7 is a fragmentary side elevational view taken along line 7—7 of FIG. 3.

FIG. 8 is a vertical sectional view taken along line 8—8 of FIG. 6, and

FIG. 9 is a transverse vertical sectional view taken along line 9—9 of FIG. 8.

One embodiment of our invention is shown generally in FIG. 1. It will be noted that the overhead conveyor system embodying our invention as shown in FIGS. 1–9 inclusive is designated generally by the numeral 10. As shown, the overhead conveyor system 10 includes a powered primary conveyor section 11 and a pair of lateral feeder conveyor sections or lines 12 and 13. The overall conveyor system 10 has a discharge terminal portion 14 which is supported by a pair of overhead brackets 15 and 16 secured to a building construction, not shown. A platform 17 is carried by the overhead brackets 15 and 16 to support an electric motor 18.

The drive shaft 19 of the motor 18, as best shown in FIG. 5 carries a drive sprocket 20 which is rotatably mounted between elongated side plates 21 and 22. Each of the conveyor sections 11–13 are constructed similarly in that they have corresponding side plates and continuous flexible conveyor means moving therebetween with the upper surface thereof extending only slightly above the upper edge of the side plates.

The side plates 21 and 22 are parallel and laterally spaced and are generally L-shaped in cross-section. Reference to FIG. 6 shows that the upper edge portions 23 and 24 of the side plates 21 and 22 extend inwardly to function as guide means in cooperation with spacer blocks 25, the latter functioning to maintain the side plates in fixed spaced relation. A plurality of rivets or bolts such as indicated by the numeral 26 holds the side plates in parallel fixed spaced relation in the manner best seen in FIG. 6.

A continuous flexible chain 27 rides upon the upper surface of the spacer blocks 25 so that the upper surface thereof extends slightly above the upper edge portions of the side plates while the lower surface of the chain is disposed between these side plates. This can best be seen in FIG. 6. The flexible chain 27 is formed of a plurality of pivotally connected links which define concavities 28 in the upper surface of the flexible chain which functions as a continuous conveyor. These concavities can best be seen by reference to FIG. 5.

The continuous flexible chain 27 is trained around the drive sprocket 20 and over a freely rotatable tightener sprocket 29 which is mounted on pivot arm 30, the latter being fixedly connected to and pivoting with pivot pin 31 as shown in FIG. 5. Lever arm 32 is also fixedly connected to pivot pin 31 and pivots therewith and bears against a threaded pin 33 which is threadedly mounted within an internally threaded ear 34 that is fixedly mounted on side plate 22.

Rotatably mounted between the side plates 21 and 22 at their opposite end portions is an idler sprocket 35 which is carried by shaft 36 that extends laterally beyond the section 11 of the conveyor. This can best be seen by reference to FIG. 3. A journal 37, as viewed in FIG. 4 is carried by the side plate 21 and journals the shaft 36. Fixedly connected to the idler sprocket 35 is a pair of axially spaced discs 38 and 39 which have teeth 38a and 39a respectively that extend in the direction of rotation of the discs. Spacers 40 and 41 are disposed between the idler sprocket 35 and the discs 38 and 39 and are secured thereto by rivets 42 which are clearly shown in FIG. 4. Discs 38 and 39 together constitute a rotary pickup element or member 43 which functions in a manner to be hereinafter described.

Shaft 36 is journalled in journal 44 which is fixedly connected to side plate 22 of the primary power conveyor line 11. Journal 44 is provided with an annular flange 45 and a reduced portion 46 which is telescopically received within the bore 47 of an angle gear or bevel gear housing 48. The reduced portion 46 is provided with an annular groove 49. Journal 44 is held within mounting plate 50 by a pair of screws such as is indicated by the numeral 51 in FIG. 4, these screws being threaded into the hollow housing 48 as clearly shown in that figure. Mounting plate 50 is connected at its top by a rigid plate 52 and at its bottom by a second rigid transverse plate 53 to a second mounting plate 54. Hanger 55 is secured to the upper rigid plate 52 to support both of the mounting plates 50 and 54 and the structure carried thereby.

Shaft 36 (see FIG. 3) carries a bevel gear 56 at its intermediate portions and extends through mounting plate 54 in which it is journalled. The shaft 36 carries a sprocket 57 at its outer end. A second bevel gear 58 is mounted on the end of a shaft 59 which is rotatably mounted within the housing 48. This second bevel gear 58 is driven by bevel gear 56 as best shown in FIG. 3. Together the bevel gears 56 and 58 form what is commonly known in the art as an angle gear. The shaft 59 is journalled in housing 48 which in turn is fixedly secured to plate 53 by bolts 60. This shaft 59 extends beyond the housing 48 and carries a drive sprocket 61 at its outer end portion.

Drive sprocket 61 and shaft 59 are rotatably mounted between slide plates 62 and 63 and drive the chain 64 of this section. The chain 64 extends around another idler sprocket (not shown) which is mounted between the side plates 62 and 63 at a location remote from the sprocket 61. Thus it can be seen section 13 is constructed substantially identical to the section 11 except that drive sprocket 61 is powered by shaft 59 rather than by motor 18.

A transfer element or slide rail 65 is carried by the discharge portion of section 13 and is positioned to receive article-suspending devices such as hangers 66 which are shown in FIG. 6. Slide rail 65 slopes downwardly and terminates immediately adjacent pickup wheel 43 so that teeth 38 and 39 pass therebetween and pick up the devices 66 as they slide down the incline of rail 65. Slide rail 65 is comprised of spaced curved plate members 67 and 68.

Sprocket 57 carries a flexible continuous chain 69, which as shown in FIG. 2, extends upwardly around a pair of idler sprockets 70, 71 which are rotatably mounted on mounting plate 54. This can best be seen in FIG. 2. One or both of these sprockets are vertically adjustable to permit adjustment of the tension of the chain.

The chain 69 is also trained around the sprocket 72 which is mounted on the outer end of the countershaft 73. This countershaft 73 extends parallel to shaft 36 and is rotatably mounted on plates 50, 54. The opposite end of the countershaft 73 carries a drive sprocket 74 which is rotatably mounted between the end portions of the side plates 75, 76 of the overhead conveyor section 12 and is driven by sprocket 72 and shaft 73.

The side plates 75, 76 can pivot around shaft 73 and carry a transfer member 77. This transfer member 77 is comprised of a slide rail which is also formed of plate material, shaped and inclined as shown in FIG. 1. The inclination of the slide rail 77 can be adjusted by first loosening adjustment nut 77a and then swinging rail 77 about the axis or shaft 73 and relative to side plates 75, 76. The terminal portion of slide rail 77 terminates immediately adjacent pickup wheel 43 and above slide rail 65 so that article-suspending devices such as hangers 66 will be engaged thereby as the pickup wheel rotates.

Side plates 75, 76 of conveyor section 12 are held in laterally spaced relation by spacer blocks 25 just as the sections 11 and 13 are so spaced, to accommodate the continuous chain 78. The section 12 is highly similar in construction to that of sections 11 and 13 and hence has its chain 78 trained around an idler sprocket (not shown) disposed at its opposite end and mounted on shaft 79. The section 12 is supported by hangers 80, 81 which in turn are supported by a building construction (not shown). These hangers 80, 81 are preferably adjustable longitudinally so that section 12 may be elevated or lowered as desired to extend at an angle to the other sections and to a horizontal plane as illustrated in FIG. 1.

Adjacent the discharge portion of section 12 which carries slide rail 77 there is provided an automatic control mechanism 82 which functions to hold back the hangers 66 and release them periodically in timed relation so that their discharge upon rail 65 and pickup wheel 43 can be controlled as desired. This automatic control mechanism 82 includes an elongated U-shaped channel member 83 fixedly secured to the side plates by bolts 26 and aiding in rotatably mounting a shaft 84 that extends through the rearward portions of the channel member and through side plates 75 and 76. This shaft 84 extends laterally thereof through the opposite leg of the channel member 83 as best seen in FIG. 6. It will be noted that the shaft 84 is journalled in the lower portions of the side plates and rotatably mounts a drive sprocket 84a which is driven by chain 78, the latter extending thereacross so that the sprocket 84a rotates in a direction opposite to the direction of rotation of sprocket 74.

Pivotally mounted on the outer end of shaft 84 is an elongated inverted L-shaped member 85 which is free to pivot in a vertical plane about shaft 84. At its forward end of the L-shaped member 85 carries a second L-shaped member 86 which extends horizontally over section 12 as best shown in FIG. 6 and carries a depending hanger-engaging abutment member 87.

Pivotally mounted in the forward end portion of the U-shaped member 83, as shown in FIG. 9, is an idler shaft 89 which carries idler sprocket 90. A continuous flexible chain 91 is trained around sprocket 90 and also around sprocket 92 which is mounted on shaft 84. Chain 91 has a cam pin 93 fixedly mounted on one of its links and extending laterally therefrom. This cam pin 93 travels with chain 91 and, as it rises in its travel around sprocket 90 it engages a downwardly and rearwardly sloped forward edge 94 of a trip member 95 which is in position, as shown in FIG. 6, alongside sprocket 90 and chain 91 to engage cam pin 93 and thereby cause element 87 to pivot upwardly with element 85. Upwardly movement of element 87 permits one or more hangers 66 to pass before the element 87 again descends and arrests the forward movement of the hangers. The length of time element 87 is maintained in elevated position, of course, depends upon the width of the lower end portion of trip member 95 for as soon as cam pin 93 passes this trip member, the L-shaped member 85 and the abutment member 87 will again descend by gravity.

A slick rail 96 is fixedly secured to the powered section 11 at its discharge terminal and is adapted to slidably receive the hangers 66 as they are discharged by the chain 27. It will be noted that this slick rail 96 is downwardly inclined and that its lower and outer end (not shown) may be curved and bent to a horizontally extending position to collect and support a large number of the hangers 66; it being understood, of course, that additional support will be provided to support the added weight.

It will be appreciated that the sections 12 and 13 may be elevated relative to section 11 or at the same elevation so long as the discharge portion thereof is sufficiently elevated relative to the receiving end portion of the section 11 that the slide rails of the sections 12 and 13 may be inclined downwardly to the pickup wheel 43.

From the above it can be seen that the construction of our conveyor system is unusually simple and inexpensive. In addition to this, however, this system has a number of distinct advantages for it functions in a practical and convenient manner. It will be noted that the hangers 66 can be applied to the primary powered section 11 or to either of the lateral feeder lines 12 and 13 at any point along their length as desired. It will also be readily recognized that additional lateral feeder lines such as 12 and 13 may feed into the primary power conveyor line 11 at any angle desired in a horizontal plane and at a fairly substantial incline. Thus with the use of the vertically adjustable feature it is possible for sections of the conveyor to pass from one floor to another of a manufacturing building or to reach any portion of a large manufacturing room on a given floor. As the hangers 66 are deposited upon the section 13 for example, they rest in the concavities 28 thereof and are carried along the length of the section. As they reach the slide means comprised of the inclined slide surfaces of the downwardly inclined slide rail 65, they are deposited thereupon and slide downwardly to a position immediately adjacent pickup wheel 43, the teeth of which engage the hangers and lift them as best shown in FIG. 7 to a point where the hangers are deposited upon the conveyor chain of the primary powered conveyor section 11 from whence they are carried forward and discharged upon the slick rail 96.

Similarly, hangers 66 which are deposited upon section 12 will ride in the concavities 28 of the desired shape and depth of that section until they reach the abutment member 87 at which point their forward movement is arrested. The continuous chain 78 will continue to slip past the hook portion of the hangers 66 and the hangers will be held at this point and released periodically by the control mechanism. As the chain 78 continues to drive the sprocket 85, the chain 91 moves around its sprockets 90 and 92 so that the cam pin 93 engages the forward edge 94 of the trip member 95. Continued movement of the cam pin 93 cams the trip member 95 upwardly to cause the abutment member 87 to be elevated to an out of way position for a desired period to permit one or more hangers 66 to pass thereby. As soon as the cam pin 93 passes the trip member 95, the abutment member 87 again descends and arrests the remaining supply of hangers 66. From this it can be seen that the hangers 66 can be set onto the primary powered conveyor line 11 regularly and periodically to avoid collisions or jamming with hangers from the other conveyor line.

It should be noted that the entire conveyor system is powered by a single motor 18. This is accomplished by the power transfer mechanism best shown in FIGS. 2 and 3 which includes the flexible coupling or chain 69 which permits the power to be transmitted from the electric motor and the primary powered conveyor line to each of the lateral feed lines 12 and 13. It will be readily understood, of course, that the source of power could be applied to any one of the lines by utilizing a similar power transfer mechanism. It will be noted that this mechanism is relatively simple and inexpensive and yet highly efficient.

It will also be noted that the chain 27 may be maintained in taut condition by adjusting the threaded pin 33 within the internally threaded ear 34. Thus the chain 27 can be maintained at the desired degree of tautness through adjustment of this element 33.

Thus it can be seen that we have provided a novel and improved overhead conveyor system which is unusually simple and inexpensive both as to construction and operation. This system can be operated with relatively inexperienced personnel and with a minimum and almost complete lack of attention thereto. It will be noted that a single feeder line may be utilized or almost any number of lateral feeder lines may be provided to operate in conjunction with the primary powered conveyor line and to be powered therefrom. Each of the conveyor sections may be provided with a full automatic control such as the control 82 to regulate the introduction of the suspended items onto the primary power conveyor line. Moreover, the system has unusual flexibility in that the sections thereof may be angulated relative to each other and may also be inclined relative to each other in that each of the sections is pivotable relative to each other. Furthermore, a single source of power may be utilized to drive the entire system. In addition, the material supporting member such as the hangers 66 may be applied to the individual sections of the conveyor system at any point along their length, thereby providing increased flexibility in usage and adaptation.

It will, of course, be understood that various changes may be made in the form, details, arrangement and proportions of the parts without departing from the scope of this invention which consists of the matter shown and described herein and set forth in the appended claims.

What we claim is:

1. A material handling conveyor system comprising in combination a primary conveyor line and at least one lateral conveyor feeder line having an angular junction with said primary conveyor line, said primary conveyor line being pivotal at each junction with each of said lateral conveyor feeder lines, each of said conveyor sections being in the form of a substantially closed channel structure having closed sides and bottom, the upper edge portion thereof having an open slot extending longitudinally the full length thereof, at least one pair of longitudinally spaced wheels journaled in the respective sides of said channel structure, and an endless conveyor chain running over said wheels, only the upper edge portion of said conveyor chain being exposed via the said open slot and extending above the horizontal plane of the upper edge portion of the channel, slide means affording communication between the primary conveyor line and the lateral conveyor feeder lines, and rotary pick-up means associated with each wheel at each junction of said primary conveyor line and one of said lateral conveyor lines whereby materials supported on the conveyor chain are advanced from a lateral feeder line onto said primary conveyor line, and means for driving said conveyor lines.

2. The structure defined in claim 1 and automatic feed control means mounted on said lateral feeder line regulating the flow of materials supported on the conveyor chain of said lateral conveyor feeder line onto the primary conveyor line.

3. The structure defined in claim 1 wherein said lateral conveyor feeder line extends at an angle to said primary conveyor line and said slide means extends downwardly from said primary conveyor line to said pick-up means, said slide means having a relatively sharp radius of curvature.

4. The structure defined in claim 1 wherein said rotary pick-up means is comprised of a toothed wheel.

5. The structure defined in claim 1 wherein said means for driving said conveyor lines includes a single source of rotary power connected in direct driving relation to one of said conveyor lines and power transfer mechanism extending between said conveyor lines, said power transfer mechanism including a pair of shafts having parallel axes, extending transversely of said conveyor lines, one of said shafts being connected in driven relation to the conveyor line being driven directly by said power source and the other of said shafts being connected in driving relation to the other of said conveyor lines, and a flexible drive coupling extending between said shafts in driving relation, said drive coupling having portions thereof intermediate said shafts extending through planes elevated relative to said conveyor lines.

6. The structure defined in claim 1 wherein said means for driving said conveyors is comprised of a single source of rotary power connected in direct driving relation to one of said conveyor lines and power transfer mechanism extending between said conveyor lines, such power transfer mechanism being comprised of a pair of parallel rotatable shafts having axes of rotation extending transversely of two of said conveyor lines, one of said shafts being connected in driven relation to said directly driven conveyor and the other of said shafts being connected to the other of said two conveyor lines in driving relation, a flexible drive coupling extending between said shafts in driving relation and above said conveyor feeder line which extends at an angle to said primary conveyor line, a bevel gear mounted on one of said shafts and rotating therewith, a third shaft rotatably mounted and extending transversely of said two previously mentioned shafts and being connected in driving relation with said conveyor feeder line extending at an angle to said primary conveyor line, and a bevel gear carried by said third shaft and engaging said first mentioned bevel gear in driven relation whereby said conveyor feeder line which extends at an angle to said primary conveyor line is driven by said source of rotary power.

7. An overhead conveying system comprising a continuous conveyor adapted to be mounted in an overhead position within a building and having a discharge portion, a transfer element mounted adjacent the discharge portion of said conveyor and receiving article-suspension devices therefrom a second continuous conveyor having a receiving portion and being adapted to be mounted in overhead position within a building with its receiving portion adjacent said transfer element means connected to said conveyor sections for driving the same, a rotary pick-up member having a fixed radius mounted for rotation adjacent said transfer element and receiving therefrom and discharging upon said second conveyor as it rotates, and means connected to said pick-up element for rotating the same.

8. The structure defined in claim 7 wherein said transfer element is inclined downward from said first mentioned conveyor toward said second mentioned conveyor and toward said pick-up member to provide for sliding movement of such article-suspension devices by action of gravity to said pick-up member.

9. The structure defined in claim 7 wherein said pick-up member is comprised of a rotary member having outwardly extending tooth elements at its periphery for engaging such article-suspension devices and elevating the same onto said second conveyor.

10. The structure defined in claim 7 wherein said first mentioned conveyor is elevated relative to said second mentioned conveyor.

11. The structure defined in claim 7 wherein the discharge portion of said first mentioned conveyor is elevated relative to the lowermost portions of said rotary pick-up member.

12. The structure defined in claim 7 wherein said transfer element has inclined slide surfaces adapted to support such article-suspension devices in sliding relation, said surfaces extending downwardly from a position adjacent the discharge portion of said second mentioned conveyor to a lower location immediately adjacent said rotary pick-up member.

13. The structure defined in claim 7 wherein said transfer element has downwardly inclined slide surfaces from the discharge portion of said first mentioned conveyor to said rotary pick-up member and terminating immediately adjacent thereto at an elevation below the axes of rotation of said member.

14. The structure defined in claim 7 wherein said first mentioned conveyor is disposed at the same elevation as said second mentioned conveyor and said transfer element is inclined downwardly from said first mentioned conveyor toward said second mentioned conveyor and toward said pick-up member to provide for sliding movement of such article-suspension devices by action of gravity to said pick-up member.

15. A material handling conveyor system comprising in combination a primary conveyor line and at least one lateral conveyor feeder line, said lateral conveyor line having an angular junction with said primary conveyor line, said conveyor sections being in the form of a closed channel having closed side and bottom members, the upper edge portions thereof having an open slot extending longitudinally the full length thereof, a mounting and stiffening block mounted in said channel and extending the full length thereof, at least one pair of longitudinally spaced sprocket wheels journaled in the respective side portions of the channel and an endless roller chain running around said sprocket wheels, at least one geared electric motor driving directly on one of said sprocket wheels in said primary conveyor line, said sprocket wheels and said roller chains throughout the entire conveyor system being constructed and arranged to expose the upper portion of said chains in said slots above the horizontal plane of the upper edge portion of the channel whereby material supporting hangers may engage said roller chain, slide means at the terminal end portions of said lateral conveyor feeder line, said slide means being in the form of downwardly inclined slide surfaces connected to the terminal end portion of the lateral conveyor feeder line capable of having a sharp radius at the junction with the primary conveyor line to make junction therewith from any angle, automatic pickup and advancing means at the junction of said conveyor lines in the form of a driven toothed wheel whereby material handling hangers are picked up and advanced onto the primary conveyor line, and automatic feed control means mounted on said lateral conveyor line and regulating the flow of material hangers on the primary and lateral conveyor lines to prevent jamming of the same at the angular junction thereof.

16. A material handling conveyor comprising a substantially closed channel structure having closed sides and bottom, the upper edge portion thereof having an open slot extending longitudinally the full length thereof, at least one pair of longitudinally spaced wheels journaled in the respective sides of said channel structure, and an endless conveyor chain running over said wheels, only the upper edge portion of said conveyor chain being exposed via the said open slot and extending above the horizontal plane of the upper edge portion of the channel.

17. An overhead conveying system comprising a continuous conveyor adapted to be mounted in an overhead position within a building and having a discharge portion, a transfer element mounted adjacent the discharge portion of said conveyor and receiving article-suspension devices therefrom, a second continuous conveyor having a receiving portion and being adapted to be mounted in overhead position within a building with its receiving portion adjacent said transfer element, means connected to said conveyor sections for driving the same, a rotary pick-up member mounted for rotation about a horizontal axis adjacent said transfer element and receiving therefrom and discharging upon said second conveyor as it rotates, and means connected to said pick-up element for rotating the same.

References Cited in the file of this patent
UNITED STATES PATENTS
3,006,453    Tonelli _____ Oct. 31, 1961